United States Patent
Li et al.

(10) Patent No.: US 9,843,435 B2
(45) Date of Patent: Dec. 12, 2017

(54) METHOD AND ARRANGEMENTS IN MULTI-BAND RECEIVERS

(71) Applicant: TELEFONAKTIEBOLAGET LM ERICSSON (PUBL), Stockholm (SE)

(72) Inventors: Ming Li, Beijing (CN); Youping Su, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/118,164

(22) PCT Filed: Feb. 12, 2014

(86) PCT No.: PCT/CN2014/071997
§ 371 (c)(1),
(2) Date: Aug. 11, 2016

(87) PCT Pub. No.: WO2015/120585
PCT Pub. Date: Aug. 20, 2015

(65) Prior Publication Data
US 2017/0187509 A1    Jun. 29, 2017

(51) Int. Cl.
*H04L 5/14* (2006.01)
*H04W 72/04* (2009.01)
*H04W 88/02* (2009.01)

(52) U.S. Cl.
CPC ........... *H04L 5/14* (2013.01); *H04W 72/0453* (2013.01); *H04W 88/02* (2013.01)

(58) Field of Classification Search
CPC .............................. H04L 5/14; H04W 72/0453
See application file for complete search history.

(56) References Cited

U.S. PATENT DOCUMENTS 5,995,815 A * 11/1999 Blom ............... H03J 5/244
455/143
6,091,715 A * 7/2000 Vucetic ............ H04B 1/406
370/277

(Continued)

FOREIGN PATENT DOCUMENTS

CN    102540204 A    7/2012
EP    0678974 A2    10/1995

(Continued)

*Primary Examiner* — Ian N Moore
*Assistant Examiner* — Latresa McCallum

(57) ABSTRACT

In a method of a heterodyne FDD receiver for enabling reception of a multi-band RXRF signal spectrum, an RXRF signal spectrum is received, which comprises a lower frequency band and a higher frequency band. A Local Oscillator, LO, output frequency, $f_{LO}$, is selected based on a frequency $f_A$ of the lower frequency band, and a frequency $f_B$ of the higher frequency band. Moreover, the RXRF signal spectrum is frequency shifted into an RXIF signal spectrum, by mixing the RXRF signal spectrum with the LO output frequency $f_{LO}$. The LO frequency $f_{LO}$ is selected to satisfy $f_A < f_{LO} < f_B$, where $f_A$ and $f_B$ are any frequency of the lower or higher frequency band, respectively.

10 Claims, 7 Drawing Sheets

(56) References Cited

U.S. PATENT DOCUMENTS

| | | | |
|---|---|---|---|
| 6,212,576 B1 * | 4/2001 | King | H04B 1/403 |
| | | | 719/328 |
| 2002/0173337 A1 | 11/2002 | Hajimiri et al. | |
| 2010/0297975 A1 | 11/2010 | Carrera et al. | |
| 2011/0300818 A1 * | 12/2011 | Mirzaei | H03H 7/40 |
| | | | 455/127.2 |
| 2011/0300885 A1 * | 12/2011 | Darabi | H04B 1/52 |
| | | | 455/500 |
| 2013/0243121 A1 | 9/2013 | Bai | |

FOREIGN PATENT DOCUMENTS

| | | |
|---|---|---|
| EP | 0932251 A1 | 7/1999 |
| WO | 2012143756 A1 | 10/2012 |

\* cited by examiner

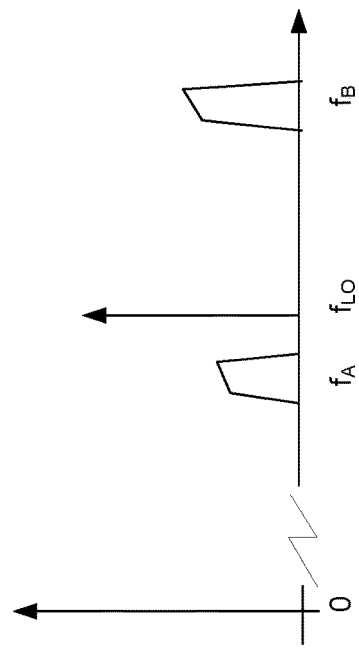
Fig. 5a
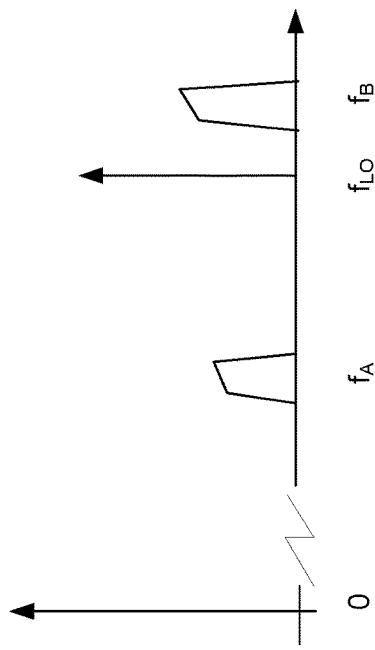
Fig. 5b
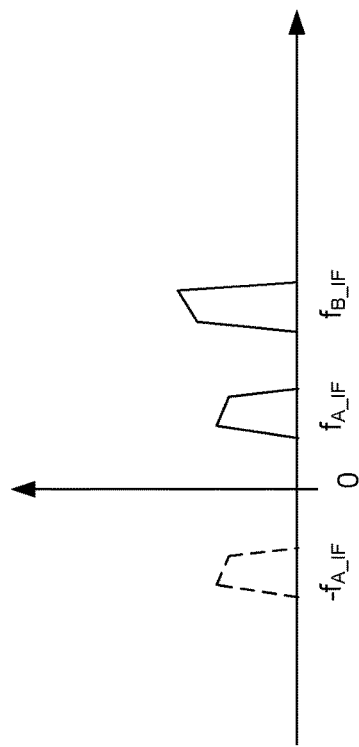
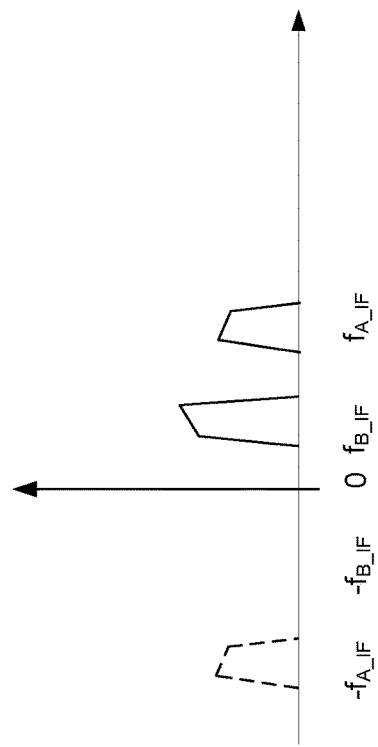

METHOD AND ARRANGEMENTS IN MULTI-BAND RECEIVERS

This application is a 371 of International Application No. PCT/CN2014/071997, filed Feb. 12, 2014, the disclosure of which is fully incorporated herein by reference.

TECHNICAL FIELD

The present disclosure relates to radio receivers in communication networks, especially it relates to arrangements for reception of multiple frequency bands in radio communication equipments.

BACKGROUND

With emergence of services in communication networks, increased communication capacity of data is today required by end users. The end users use UEs to communicate data in basebands with radio base stations in radio access networks. In order to face the required increased communication capacity, modern radio base stations have been developed which are capable to use and handle basebands which comprise multiple frequency bands when communicating data according to various services.

The frequency bands are defined and assigned by authorities, e.g. the EBU (European Broadcasting Union), to operators of the communication networks and the operators decide which frequency bands that will be used by the UEs.

In this description, the term "User Equipment" (UE) will be used to denote any suitable communication terminal adapted to communicate with a radio base station. A UE, may be implemented as a mobile phone, a PDA (Personal Digital Assistant), a handheld computer, a laptop computer, etc. A "radio base station" may be implemented as a NodeB, an eNodeB, a repeater, etc.

The frequency bands which are assigned to the UEs or radio base stations for their communication are separated in the frequency plane. For widely separated frequency bands, e.g. separated as much about 1 GHz from each, the UEs have specific functionality for handling the separated frequency bands. Some examples of such functionality will be described below.

The FIG. 1 which is a schematic graph illustrates a situation where two frequency bands A and B are separated with 1 GHz, e.g. a frequency fA of the frequency band A is 1 GHz lower than a frequency fB of the frequency band B.

In order to make use of widely separated frequency bands receivers are commonly designed with double receiver branches, which will be described below with reference to the FIGS. 2 and 3.

FIG. 2 is a schematic block diagram which illustrates an arrangement in an FDD (Frequency Division Duplex) double band receiver 200.

An RXRF (Receiver Radio Frequency) signal spectrum which comprises a lower frequency band and a higher frequency band is received at an antenna 202. The frequency bands are separated and handled by two respective branches of the receiver 200. The lower frequency band with a centre frequency of $f_A$ is handled by the upper branch of the receiver 200, and the higher frequency band with a centre frequency of $f_B$ is handled by the lower branch of the receiver 200. In addition, four graphs are illustrating the situation at four positions of the branches, which will be further described below.

When the RXRF signal spectrum has been received by the antenna 202, a set of band-pass filters 204 are arranged to divide the RXRF signal spectrum into the two branches, i.e. to separate the RF upper and lower frequency bands. The lower RF frequency band and the upper RF frequency band are amplified with respective LNAs (Low Noise Amplifiers) 206, and are further filtered by respective RF filters 208. Commonly, respective adjustment means 210 are arranged to adjust the power levels of the respective RF frequency bands. The RF frequency bands are frequency shifted into corresponding IF (Intermediate Frequency) frequency bands by RF Mixers 212, which are arranged in the respective branches. The input signal to the upper mixer 212 is illustrated in the upper right graph, where the lower frequency band with a frequency $f_A$ and an LO (Local Oscillator) output signal $f_{loA}$ are seen. The resulting output signal of the upper mixer 212 is illustrated in the upper left graph, where the lower frequency band with the frequency $f_{A\_IF}$ is seen.

Correspondingly, the input signal to the lower mixer 212 is illustrated in the lower right graph, where the upper frequency band with the frequency $f_B$ and another LO output signal $f_{loB}$ are seen. The resulting output signal of the lower mixer 212 is illustrated in the lower left graph, where the upper frequency band with the frequency $f_{B\_IF}$ is seen.

Commonly, the IF frequency bands of the branches are further filtered by IF band-pass filters 214, 218, and power adjusted by level adjustment means 216 before being feed into A/D converters 220 to be converted into a first frequency band and a second frequency band of the baseband.

If the receivers handle multiple frequency bands which are located closer to each other, the frequency bands are commonly handled by one single branch, which will be described below.

FIG. 3 is a schematic block diagram which illustrates an arrangement in an FDD (Frequency Division Duplex) double band receiver 300.

An RXRF (Receiver Radio Frequency) signal spectrum which comprises a lower frequency band and a higher frequency band is received at an antenna 302. A difference when compared with the double band receiver of FIG. 2 is that the two frequency bands $f_A$ and $f_B$ are handled by one and the same branch of the receiver 300. In addition, two graphs are illustrating the situation at two positions of the receiver 300, which will be further described below.

When the RXRF signal spectrum has been received by the antenna 302, a set of band-pass filters 304 are arranged to extract an upper and a lower RF frequency bands, i.e. the two frequency bands $f_A$ and $f_B$. The lower RF frequency band and the upper RF frequency band are amplified with an LNA 306, and are further filtered by respective RF filters 308. Commonly, an adjustment means 310 is arranged to adjust the power levels of the RF frequency bands. The RF frequency bands are frequency shifted into corresponding IF (Intermediate Frequency) frequency bands by RF Mixer 312. The input signal to the mixer 312 is illustrated in the right graph, where the upper and lower frequency bands with the frequencies $f_A$ and $f_B$ and an LO (Local Oscillator) output signal $f_{lo}$ is seen. The resulting output signal of the mixer 312 is illustrated in the left graph, where the lower and the upper frequency bands with the centre frequencies $f_{A\_IF}$ and $f_{B\_IF}$ are seen.

Commonly, the IF frequency bands of the branches are further filtered by IF band-pass filters 314, 318, and power adjusted by level adjustment means 316 before being feed into an A/D converter 320 to be converted into a first frequency band and a second frequency band of the baseband.

To be able to reconstruct the frequency bands into a receiver baseband, the A/D converter 320 need to apply a sample frequency which is higher than or equal with twice an upper edge frequency of the upper frequency band. Circuits for sampling with high sampling frequencies are expensive to manufacture and consume a large amount of power, and therefore it is complex and expensive to provide such sampling circuits. When put into practice, there is complex, or even not possible, to design to multiband receivers for handling substantially separated frequency bands.

There is a need to devise a method for optimising multi-band receivers, and for handling used frequency bands effectively in the multi-band receivers.

SUMMARY

It would be desirable to obtain improved performance in radio receivers. It is an object of this disclosure to address at least any of the issues outlined above.

Further, it is an object to provide a mechanism for handling multiple bands in radio receivers. These objects may be met by a method and an arrangement according to the attached independent claims.

According to one aspect a method performed by a heterodyne FDD (Frequency Division Duplex), receiver for enabling reception of a multi-band RXRF (Receiver Radio Frequency) signal spectrum is provided. The method comprises receiving the RXRF signal spectrum, comprising a lower frequency band and a higher frequency band. The method comprises further selecting a Local Oscillator, LO, output frequency, $f_{LO}$, based on a frequency $f_A$ of the lower frequency band, and a frequency $f_B$ of the higher frequency band. Moreover, the method comprises frequency shifting the RXRF signal spectrum into a Receiver Intermediate Frequency, RXIF, signal spectrum, by mixing the RXRF signal spectrum with the LO output frequency $f_{LO}$. The LO frequency $f_{LO}$ is selected to satisfy:

$f_A < f_{LO} < f_B$, where $f_A$ and $f_B$ being any frequency of the lower or higher frequency band, respectively, such that when mixing the RXRF signal spectrum, one of the lower frequency band and the higher frequency band is frequency shifted into a first frequency band of the RXIF signal spectrum, and one another of the lower frequency band and the higher frequency band is frequency shifted folded into a second frequency band of the RXIF signal spectrum, and thereby enabling the heterodyne FDD receiver to process the first frequency band of the RXIF signal spectrum and the second frequency band of the RXIF signal spectrum into two separate frequency bands of a baseband.

Furthermore, the method may comprise A/D-converting the RXIF signal spectrum, converted, wherein A/D converting comprises to sample the RXIF signal spectrum with a sample frequency, fs, and the LO frequency $f_{LO}$ was selected to further satisfy one of:

$(f_B - f_{LO}) - (f_{LO} - f_A) \leq f_s/2$, and $-(f_B - f_{LO}) + (f_{LO} - f_A) \leq f_s/2$.

Moreover, both the first and the second frequency bands of the RXIF signal spectrum may be located in one and the same Nyquist zone before the sampling.

According to another aspect a heterodyne FDD receiver for enabling reception of a Receiver Radio Frequency, RXRF signal spectrum is provided. The receiver comprises an input unit, a controller, and a mixer. The input unit is adapted to receive the RXRF signal spectrum, comprising a lower frequency band and a higher frequency band. The controller is adapted to select an LO output frequency $f_{LO}$ based on a frequency $f_A$ of the lower frequency band, and a frequency $f_B$ of the higher frequency band, and the mixer is adapted to frequency shift the RXRF signal spectrum into an RXIF signal spectrum, by mixing the RXRF signal spectrum with the LO output frequency $f_{LO}$. Furthermore, the controller is arranged to select the LO frequency $f_{LO}$ to satisfy:

$f_A < f_{LO} < f_B$, where $f_A$ and $f_B$ being any frequency of the lower or higher frequency band, respectively, such that when the mixer mixes the RXRF signal spectrum, one of the lower frequency band and the higher frequency band is frequency shifted into a first frequency band of the RXIF signal spectrum, and one another of the lower frequency band and the higher frequency band is frequency shifted folded into a second frequency band of the RXIF signal spectrum. Thereby the heterodyne FDD receiver is enabled to process the first frequency band of the RXIF signal spectrum and the second frequency band of the RXIF signal spectrum into two separate frequency bands of a baseband.

According to further aspects, a communication network node, such as a NodeB or an eNodeB, or a wireless communication device, such as a UE, are provided. The respective of the communication network node and the wireless communication device, comprises the heterodyne FDD receiver according to any of the aspects above, which is adapted to perform the method according to any of the aspects above.

By selecting an LO output frequency fLO, which is between a first and a second frequency band of a received RXRF signal spectrum, when mixing into an RXIF signal spectrum, the first and the second frequency band of the RXIF signal spectrum will be located closer to each other than in the RXRF signal spectrum. Thereby, a lower sampling frequency, fs, may be applied when A/D-converting the frequency bands into a baseband of the receiver. Furthermore, multi-band receivers may be designed, which may handle widely separated frequency bands, e.g. separated about 1 GHz, without implementing multiple branches in the multiband receiver.

BRIEF DESCRIPTION OF DRAWINGS

The solution will now be described in more detail by means of exemplary embodiments and with reference to the accompanying drawings, in which:

FIGS. 5a-b are schematic graphs for double band receivers, according to possible embodiments.

DETAILED DESCRIPTION

In this description, the term "folded" will be applied to denote that a frequency band, when being frequency shifted into a negative frequency range, is frequency inverted around the "0"-axis, and absolute value of the negative frequency is smaller than original frequency.

When frequency shifting frequency bands, images of the frequency bands occur. By extracting frequency bands and suitable images folded frequency bands, a receiver baseband which comprises multiple frequency bands located close to each other is achieved.

Figure 1:
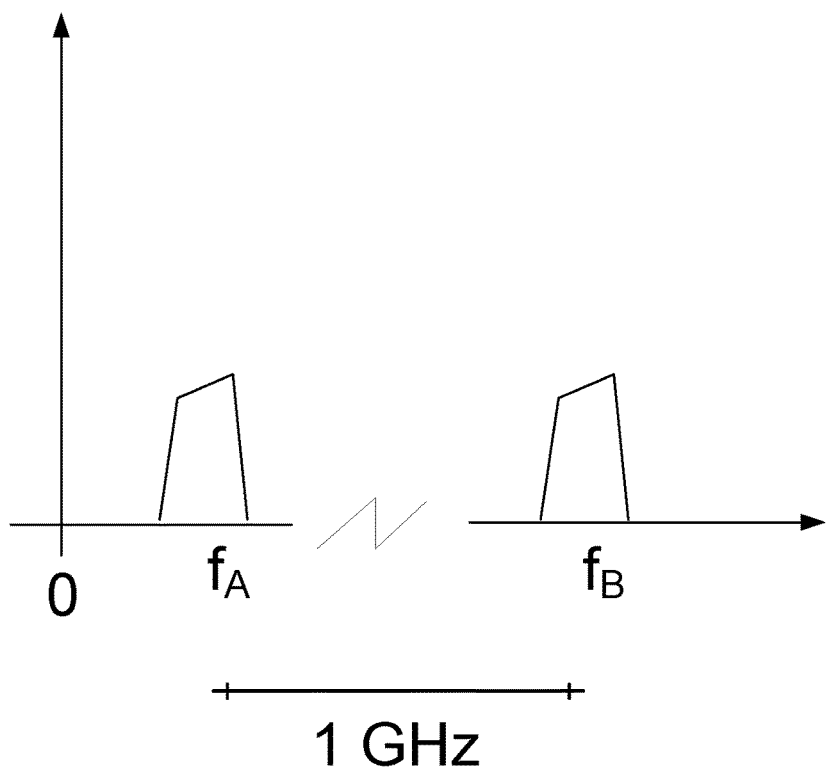
FIG. 1 is a schematic graph of a double band receiver, in accordance with the prior art.
Figure 2:
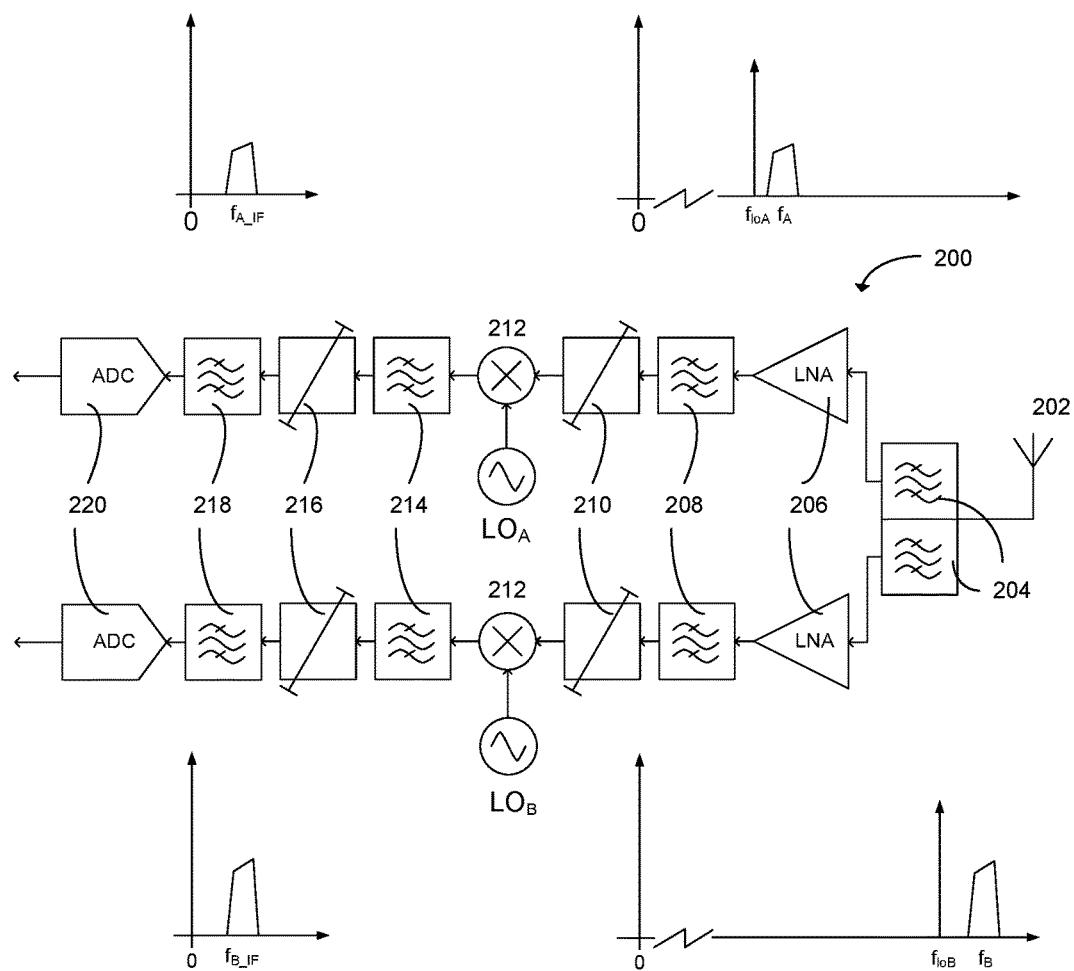
FIG. 2 is a schematic block diagram of a double band receiver, in accordance with the prior art.
Figure 3:
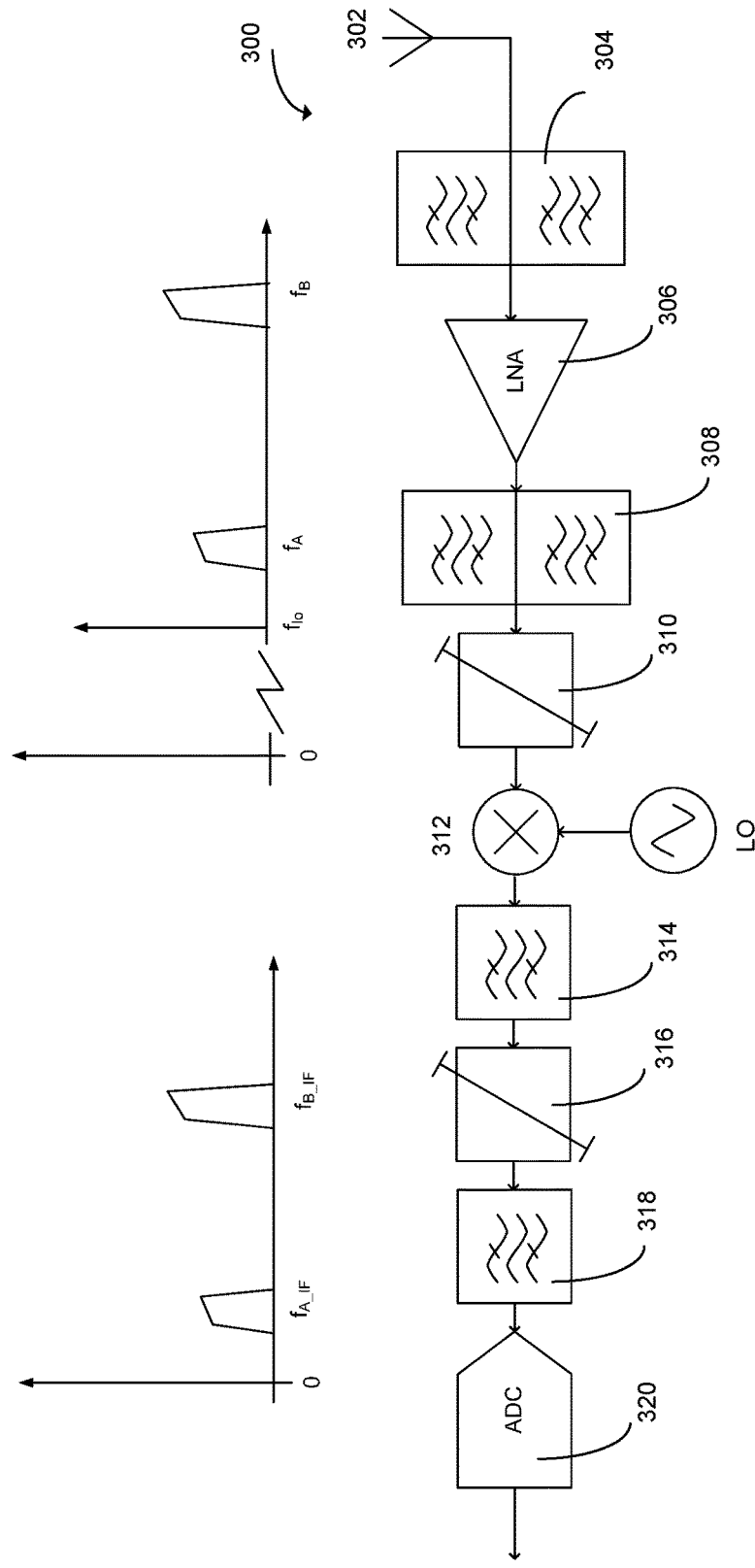
FIG. 3 is a schematic block diagram of a double band receiver, in accordance with the prior art.
Figure 4:
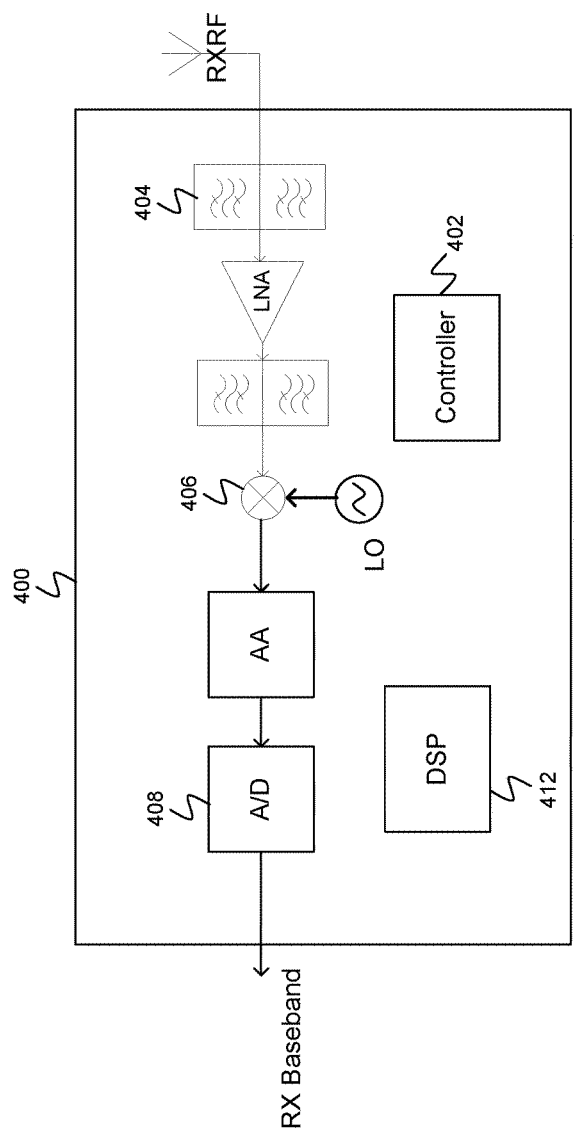
FIG. 4 is a schematic block diagram of a double band receiver, according to possible embodiments.

With reference to FIG. 4, which is a schematic block diagram, a multi-band receiver 400 will now be described in accordance with one exemplifying embodiment.

The multi-band receiver 400 is a heterodyne FDD (Frequency Division Duplex) receiver and comprises a controller 402, an input unit 404, a mixer 406, and a local oscillator LO.

The input unit 404 is adapted to filter out, i.e. extract, two RF (Radio Frequency) frequency bands from a received RXRF signal spectrum. In this embodiment the input unit 404 is equipped with a filter arrangement which filter characteristics is set to extract a higher frequency band of the RXRF signal spectrum, and a lower frequency band of the RXRF signal spectrum. The controller 402 is adapted to select and set an output frequency $f_{LO}$ of the LO, which is between the centre frequency $f_A$ of the lower frequency band and the centre frequency $f_B$ of the higher frequency band. The mixer 406 is adapted to mix the filtered RXRF signal spectrum, i.e. the two RF frequency bands with the output frequency $f_{LO}$ of the LO, into an RXIF signal spectrum, such that the two RF frequency bands are frequency shifted into respective IF (Intermediate Frequency) frequency bands, i.e. the output frequency $f_{LO}$ of the LO is subtracted from the RF bands. Due to the fact that the $f_{LO}$ is larger than the lower frequency band of the RXRF signal spectrum, and that the lower frequency band is not possible to frequency shift to a frequency spectrum below 0, no such a lower IF frequency band will occur. However, due to a folding effect, the mixing give rise to a folded version of the lower band, which will be further discussed below in conjunction with the FIGS. 5a and 5b.

Traditionally, folded versions of IF frequency bands have been seen as disturbing noise. In conventional receivers, such folded versions have been removed, i.e. been filtered out. However, the multi-band receiver 400 according to this exemplifying embodiment makes instead use of the folded lower band which comprises all the information of the RF upper band, but frequency folded around a centre frequency $f_{A\_IF}$. Thus, the output signal from the mixer 406 comprises two IF frequency bands, one upper IF frequency band and one folded lower IF frequency band, which are outputted as an RX (Receiver) baseband from the receiver 400. By selecting the LO output frequency $f_{LO}$ appropriately between the centre frequencies of the RF frequency bands, the outputted folded lower IF frequency band and the upper IF frequency band from the mixer 406 could be positioned narrower to each other in a frequency plane, than IF frequency bands of conventional multi-band receivers. Narrowing the IF frequency bands to each other is advantageously in multi-band receivers. For instance, when A/D (Analogue to Digital) converting the output signal spectrum of the mixer 406, a sampling of the output signal spectrum from the mixer 406 could be made by applying a lower sampling frequency $f_s$ than for traditional multi-band receivers.

It is to be noted that the multi-band receiver 400 is not limited to the disclosed arrangement, and that a designer may implement the multi-band receiver alternatively without departing from the disclosed concept. For instance, he/she may select to arrange various amplifiers, converters, and further filters.

In an alternative embodiment, which is based on the above described embodiment, the multi-band receiver 400 is further equipped with an LNA (Low Noise Amplifier) to amplify the incoming RXRF signal spectrum, and further filters (not referred to). Furthermore, the multi-band receiver 400 comprises an A/D-converter 408 arranged to convert each of IF frequency bands which are outputted by the mixer 406 into respective digital frequency bands in an RX baseband. By arranging the A/D-converter 408 in the multi-band receiver 400, a digital RX baseband will be able to output by the receiver 400.

In another alternative embodiment, which is based some above described embodiments, the multi-band receiver 400 is further equipped with an AA-filter (Anti-Alias) to remove frequency components outside the wanted IF frequency bands. Typically, such an AA-filter is a low-pass filter which removes frequency components out of a first Nyquist zone, i.e. frequency components above half the sampling frequency of an A/D-converter. Such higher frequency component could else give rise to aliases when being sampled and could affect the signal.

It is to be noted that the figures and embodiments illustrate a plurality of functional units in a non-limiting manner. However, a physical implementation of the proposed multi-band receiver may be performed alternatively within the disclosed concept. Furthermore, functionality of a specific illustrated unit may be implemented in another suitable unit when put into practice. For instance, calculation capacity of some of the described components and circuits may be implemented by a DSP (Digital Signal Processor) 412, which is illustrated in FIG. 4.

When put into practice, and to operate properly, the described multi-band receiver 400 may also comprise further components. For instance, a further controller (not shown) may be arranged to control the components of the multi-band receiver 400, during operation, e.g. to adjust the output frequency of the LO, and a DSP (Digital Signal Processor) 416 may be arranged to provide calculating capacity and implement functionality of any of the above described components.

In another exemplifying embodiment, which is based on the embodiment described above, the multi-band receiver 400 comprises also an amplifier 404, which is adapted to amplify the received RXRF signal spectrum. The amplifier 404 is suitably implemented as a so called LNA (Low Noise Amplifier), but even if the amplifier is selected to not introduce noise, the multi-band receiver 400 may have a further filtering unit 406 arranged to operate properly and improve signal quality of the RXRF signal spectrum after being amplified by the amplifier 404.

The selection of the output frequency $f_{LO}$ of the LO will affect the outputted baseband spectrum from the multi-band receiver 400 and the principles of the frequency shifting of the mixer 406 will now be further discussed with reference to the FIGS. 5a and 5b, which are schematic graphs of signal spectrums.

The right graph of FIG. 5a illustrates an incoming RXRF signal spectrum to the mixer 406 (shown in FIG. 4), where the output frequency $f_{LO}$ of the LO is positioned closer to the centre frequency $f_A$ of the lower frequency band, than to the centre frequency $f_B$ of the upper frequency band. The left graph of FIG. 5a illustrates instead an output RXIF signal spectrum from the mixer 406. In general, when mixing an RF frequency spectrum, with an LO frequency output signal, the LO output signal is subtracted from the incoming frequency bands, which results in a corresponding frequency shifted IF frequency spectrum with corresponding frequency bands.

As long as the LO output frequency $f_{LO}$ is below the lower edge of the lower frequency band, both the lower and the higher frequency bands are able use and process further. However, when the LO output frequency $f_{LO}$ is selected between the frequency bands, as in the right graph, the lower IF frequency band with a frequency $-f_{A\_IF}$ is in practice not able to use, i.e. negative frequencies does not exist. However, the corresponding image of the lower IF frequency band, with a frequency $f_{A\_IF}$ exists and is able to use instead. The image of the lower frequency band is in fact frequency folded, but is located closer to the higher frequency band. The folding effect is illustrated in the figure by opposite slopes of frequency bands. By setting the output frequency $f_{LO}$ of the LO to fulfil the following equations:

$$f_A < f_{LO} < f_B, \text{ and } f_{LO} < (f_A + f_B)/2,$$

the upper RF frequency band with centre frequency $f_B$ results in an upper IF frequency band with centre frequency $f_{B\_IF}$, and the lower RF frequency band with centre frequency $f_A$ results in a lower folded IF frequency band with centre frequency $f_{A\_IF}$, as is illustrated in the FIG. 5a.

The FIG. 5b illustrates a similar situation, but in this alternative exemplifying embodiment, the output frequency $f_{LO}$ of the LO to fulfil is instead set to fulfil the following equations:

$$f_A < f_{LO} < f_B, \text{ and } f_{LO} > (f_A + f_B)/2,$$

the upper RF frequency band with a frequency $f_B$ results in a lower IF frequency band with a frequency $f_{B\_IF}$, and the lower RF frequency band with a frequency $f_A$ results in a lower folded IF frequency band with a frequency $-f_{A\_IF}$, and an image of the lower folded IF frequency band, the image having a frequency $f_{A\_IF}$ as is illustrated in the FIG. 5b. Also in this figure, the right graph illustrates an RF input signal spectrum to the mixer and the left graph illustrates an IF output signal spectrum of the mixer.

For both the FIGS. 5a and 5b, the left graphs illustrate the theoretical IF frequency base bands, to illustrate the folding principle.

It is to be noted that even if the illustrated frequency bands (IF and RF) are illustrated with different amplitudes in the graphs, this is only for made to enable identification of the frequency bands and to simplify the understanding. The actual amplitudes of the frequency bands are not limited thereto when put into practice.

Figure 6:
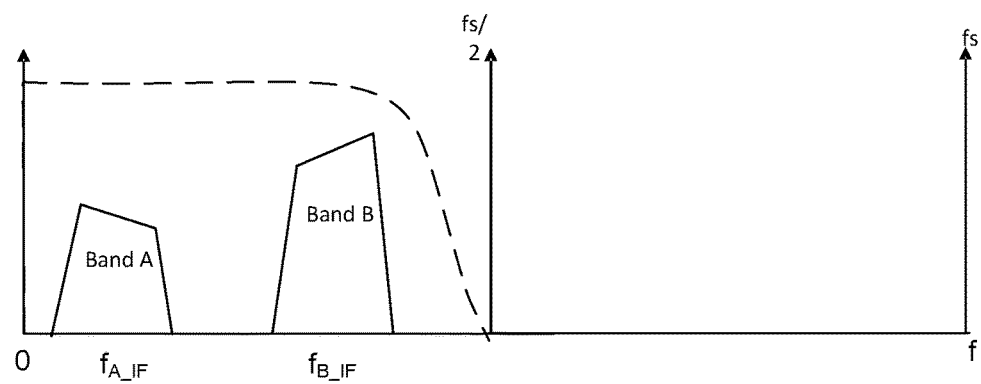
FIG. 6 is a schematic graph for a double band receiver, according to possible embodiments.

With reference to FIG. 6, which is a schematic graph, a situation in a multi-band receiver will now be described in accordance with one exemplifying embodiment.

The graph illustrates the output signal spectrum of a mixer comprised in the multi-band receiver. When compared to the left graph of FIG. 5a, this graph illustrates the corresponding situation. In FIG. 6, an RXIF signal spectrum which comprises a first frequency band A and a second frequency band B is illustrated. Furthermore, the frequency $f_{A\_IF}$ represents any frequency in the first frequency band A, and the frequency $f_{B\_IF}$ represents any frequency in the frequency band B. In addition, a filter characteristic of an anti-alias filter is illustrated as a dotted line. A sampling frequency $f_s$, and the half of the sampling frequency $f_s$ are further illustrated in the figure. The frequency interval between 0 and $f_s/2$ is referred to as the first Nyquist zone, and the frequency interval between $f_s/2$ and f is referred to as the second Nyquist zone. According to the Nyquist theorem which also is known as the sampling theorem, a signal which highest frequency component is below $f_s/2$ is possible to reconstruct after sampling the signal with $f_s$.

By extracting the two IF frequency bands A and B, i.e. the frequency band B and the folded frequency band A, and selecting an appropriate sampling frequency $f_s$, such that $f_s/2 > f_{B\_IF}$, where $f_{B\_IF}$ is any frequency in the IF frequency band B, information transmitted in the bands A and B will be able to reconstruct into an RX baseband.

Correspondingly, when the LO output frequency $f_{LO}$ instead is set closer to the lower RF frequency band, i.e. the situation in the left graph of FIG. 5b, $f_s/2 > f_{A\_IF}$, where $f_{A\_IF}$ is any frequency in the IF frequency band A, information transmitted in the bands A and B will be able to reconstruct into an RX baseband.

When referring also to the right graphs of FIGS. 5a and 5b, if the frequency $f_{LO}$ of the LO is allocated optimally according to the three parameters, fA, fB, and fs. Then, after mixing the frequency bands A and B are frequency shifted from RF to IF into one Nyquist zone, where one of the bands A and B is folded.

By selecting $f_{LO}$ and $f_s$, such that the conditions $(f_B - f_{LO}) - (f_{LO} - f_A) < f_s/2$, and $-(f_B - f_{LO}) + (f_{LO} - f_A) < f_s/2$ are fulfilled, the RF frequency bands A and B will be frequency shifted into one Nyquist zone.

It is also to be denoted that according to some embodiments the described multiband receivers of may comprise further components to operate properly, when put into practice. For instance, a designer of a multiband receiver may typically arrange image rejection filters adapted to suppress RF frequency components which are not within the appropriate RF frequency bands of the multiband receiver. Such frequency components may for instance occur from other RF frequency bands and reach the multiband receiver. By removing unwanted frequency components before mixing, the unwanted frequency component could be prevented from being mixed into the IF frequency range as images of the unwanted frequency components. Thereby the IF frequency spectrum will be less affected by noise, and further signal processing may be less complex.

Figure 7:
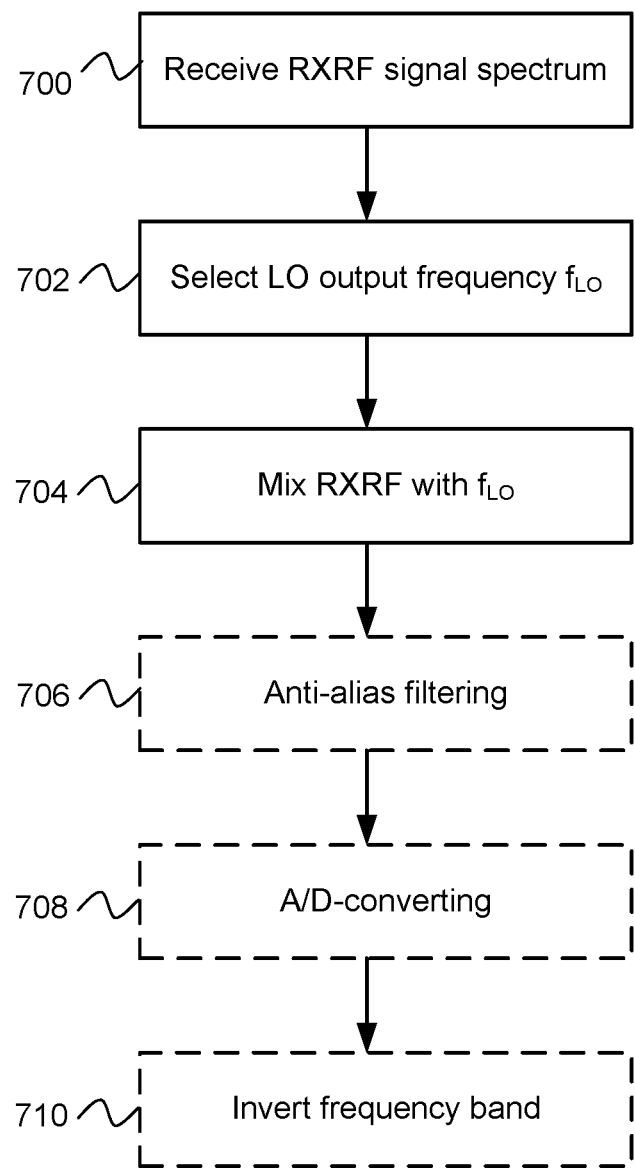
FIG. 7 is a schematic flow chart of a method, according to possible embodiments.

The described multi-band receivers according to the above described exemplifying embodiments may advantageously be implemented in any suitable communication network node or equipment which is designed to communicate data by applying multiple frequency bands, for instance in User Equipments or radio base stations. Moreover, the disclosed concept is not limited to any specific radio access technology, and may be implemented in as well systems for GSM (Groupe Special Mobile), UMTS (Universal Mobile Telecommunication System), LTE (Long Term Evolution) LTE-advanced or WiMax, or WLAN (Wireless Local Area Network) With reference to FIG. 7, which is a schematic flow chart, a method of a multi-band receiver, will now be described in accordance with one exemplifying embodiment.

The multiband receiver is a heterodyne FDD (Frequency Division Duplex) receiver and is adapted to receive an RXRF (Receiver Radio Frequency) signal spectrum which comprises a lower frequency band with a centre frequency $f_A$ and a higher frequency band with a centre frequency $f_B$, and output the frequency bands in an RX baseband.

In a first action 700, the RXRF signal spectrum is received. In a following action 702, an output frequency $f_{LO}$ of an LO (Local Oscillator) is selected, such that the output frequency $f_{LO}$ is in an interval $f_A < f_{LO} < f_B$. Optionally, in the action 700, upon reception of the RXRF signal spectrum, the lower and the higher frequency bands are filtered out, i.e.

being extracted, by a filter with appropriate filter characteristics which suppresses frequency components outside these frequency bands.

In a subsequent action 704, the RXRF signal spectrum is frequency shifted into an RXIF (Receiver Intermediate Frequency) signal spectrum, by mixing the RXRF signal spectrum with the selected output frequency $f_{LO}$. The mixing results in a first frequency band and a second frequency band, where one of the frequency bands is folded. Which frequency band that is folded depends on the selection of the $f_{LO}$. The folding principle has been discussed above in conjunction with some embodiments and will therefore not be further discussed in this embodiment.

The outputted RXIF signal spectrum comprises data to be used by a communication network node or equipment, which comprises the multi-band receiver. However, the multi-band receiver may process the RXIF signal spectrum further before being outputted, as will be discussed below in another exemplifying embodiment.

Additionally, in another exemplifying embodiment, which is based on some above described embodiments, in an additional action 706, the RXIF signal spectrum may be filtered by a an anti-alias filter. In another action 708, the RXIF signal spectrum may be A/D-converted, such that a digital baseband may be outputted by the receiver.

The folded frequency band may be processed into an unfolded version, in another action 710. By arranging appropriate calculation capacity, e.g. as a DSP (Digital Signal Processor) within the receiver, both the A/D-conversion of action 708 and the processing of action 710 could be performed within the receiver. Thereby an RX base band can be outputted to the communication equipment, which will be able to directly make use of the information of the frequency bands without further processing.

It is to be noted that the arrangements of the described exemplifying embodiments are described in a non-limiting manner. Typically, a designer may select to arrange further units and components to provide appropriate operation of the receivers, within the described concept, e.g. a plurality of suitable filters may be arranged. Moreover, physical implementations of the proposed arrangements may be performed alternatively within the disclosed concept. For instance, functionality of a specific illustrated unit may be implemented in another suitable unit when put into practice.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a heterodyne Frequency Division Duplex (FDD) receiver for enabling reception of a multi-band Receiver Radio Frequency (RXRF) signal spectrum, the method comprising:
    receiving the RXRF signal spectrum, comprising a lower frequency band and a higher frequency band,
    selecting a Local Oscillator, LO, output frequency, $f_{LO}$, based on a frequency $f_A$ of the lower frequency band, and a frequency $f_B$ of the higher frequency band,
    frequency shifting the RXRF signal spectrum into a Receiver Intermediate Frequency (RXIF) signal spectrum, by mixing the RXRF signal spectrum with the LO output frequency $f_{LO}$,
    wherein the LO frequency $f_{LO}$ is selected to satisfy:
    $f_A < f_{LO} < f_B$, $f_A$ and $f_B$ being any frequency of the lower or higher frequency band, respectively, such that when mixing the RXRF signal spectrum, one of the lower frequency band and the higher frequency band is frequency shifted into a first frequency band of the RXIF signal spectrum, and one another of the lower frequency band and the higher frequency band is frequency shifted folded into a second frequency band of the RXIF signal spectrum, and
    wherein the heterodyne FDD receiver processes the first frequency band of the RXIF signal spectrum and the second frequency band of the RXIF signal spectrum into two separate frequency bands of a baseband.

2. The method according to claim 1, wherein the RXIF signal spectrum is analog-to-digital (A/D) converted, and wherein A/D converting comprises to sample the RXIF signal spectrum with a sample frequency, fs, and the LO frequency $f_{LO}$ was selected to further satisfy one of:

$$(f_B - f_{LO}) - (f_{LO} - f_A) \leq f_s/2, \text{ and}$$

$$-(f_B - f_{LO}) + (f_{LO} - f_A) \leq f_s/2.$$

3. The method according to claim 2, wherein both the first and the second frequency bands of the RXIF signal spectrum are located in one and the same Nyquist zone before the sampling.

4. The method according to claim 2, further comprising:
    frequency shifting the first frequency band and the second frequency band of the A/D converted RXIF signal spectrum, and
    frequency inverting one of the first frequency band and the second frequency band of the A/D converted RXIF signal spectrum second band.

5. A heterodyne Frequency Division Duplex (FDD) receiver for enabling reception of a Receiver Radio Frequency (RXRF) signal spectrum, the receiver comprising:
    an input unit;
    a controller; and
    a mixer, wherein:
    the input unit receives the RXRF signal spectrum, comprising a lower frequency band and a higher frequency band, the controller selects a Local Oscillator (LO) output frequency, $f_{LO}$, based on a frequency $f_A$ of the lower frequency band, and a frequency $f_B$ of the higher frequency band, and the mixer frequency shifts the RXRF signal spectrum into a Receiver Intermediate Frequency (RXIF) signal spectrum, by mixing the RXRF signal spectrum with the LO output frequency $f_{LO}$, wherein the controller selects the LO frequency $f_{LO}$ to satisfy:

$f_A < f_{LO} < f_B$, $f_A$ and $f_B$ being any frequency of the lower or higher frequency band, respectively, such that when the mixer mixes the RXRF signal spectrum, one of the lower frequency band and the higher frequency band is frequency shifted into a first frequency band of the RXIF signal spectrum, and one another of the lower frequency band and the higher frequency band is frequency shifted folded into a second frequency band of the RXIF signal spectrum, and wherein the heterodyne FDD receiver processes the first frequency band of the RXIF signal spectrum and the second frequency band of the RXIF signal spectrum into two separate frequency bands of a baseband.

6. The heterodyne FDD receiver according to claim 5, further comprising an analog-to-digital, A/D, converter adapted to sample the RXIF signal spectrum with a sample frequency, fs, when the controller selects the LO frequency $f_{LO}$ to further satisfy one of:

$(f_B - f_{LO}) - (f_{LO} - f_A) \leq f_s/2$, and $-(f_B - f_{LO}) + (f_{LO} - f_A) \leq f_s/2$.

7. The heterodyne FDD receiver according to claim 5, being further adapted to:

frequency shift the first frequency band and the second frequency band of the A/D converted RXIF signal spectrum, and frequency invert one of the first frequency band and the second frequency band of the A/D converted RXIF signal spectrum second band.

8. The heterodyne FDD receiver according to claim 6, wherein the mixer is adapted to output both the first and the second frequency bands of the RXIF signal spectrum into one and the same Nyquist zone.

9. A User Equipment comprising a heterodyne FDD receiver according to claim 5.

10. A communication network node comprising a heterodyne FDD receiver according to claim 5.

* * * * *